A. E. WALE.
TIRE COVER AND THE LIKE.
APPLICATION FILED JUNE 6, 1913.
1,415,281.
Patented May 9, 1922.
2 SHEETS—SHEET 1.
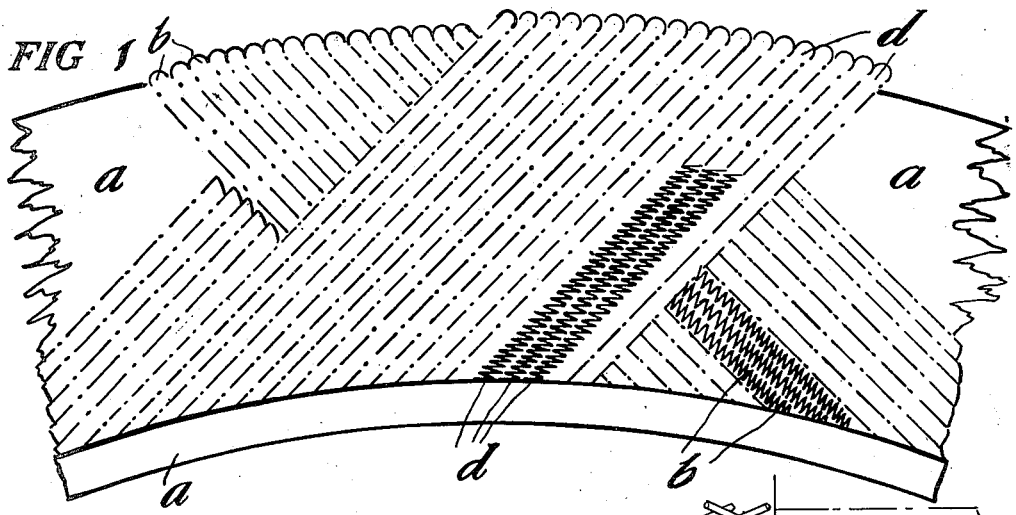
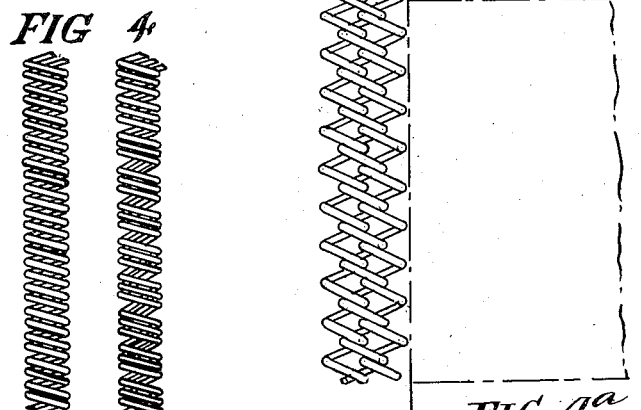
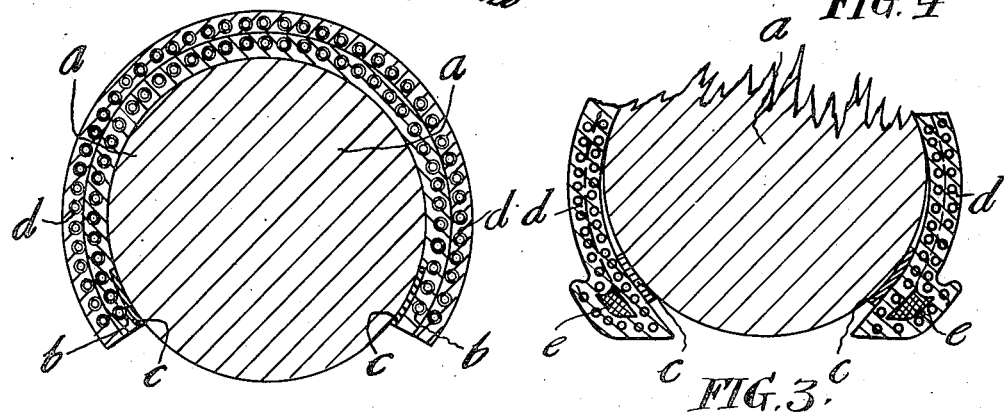

A. E. WALE.
TIRE COVER AND THE LIKE.
APPLICATION FILED JUNE 6, 1913.
1,415,281.
Patented May 9, 1922.
2 SHEETS—SHEET 2.
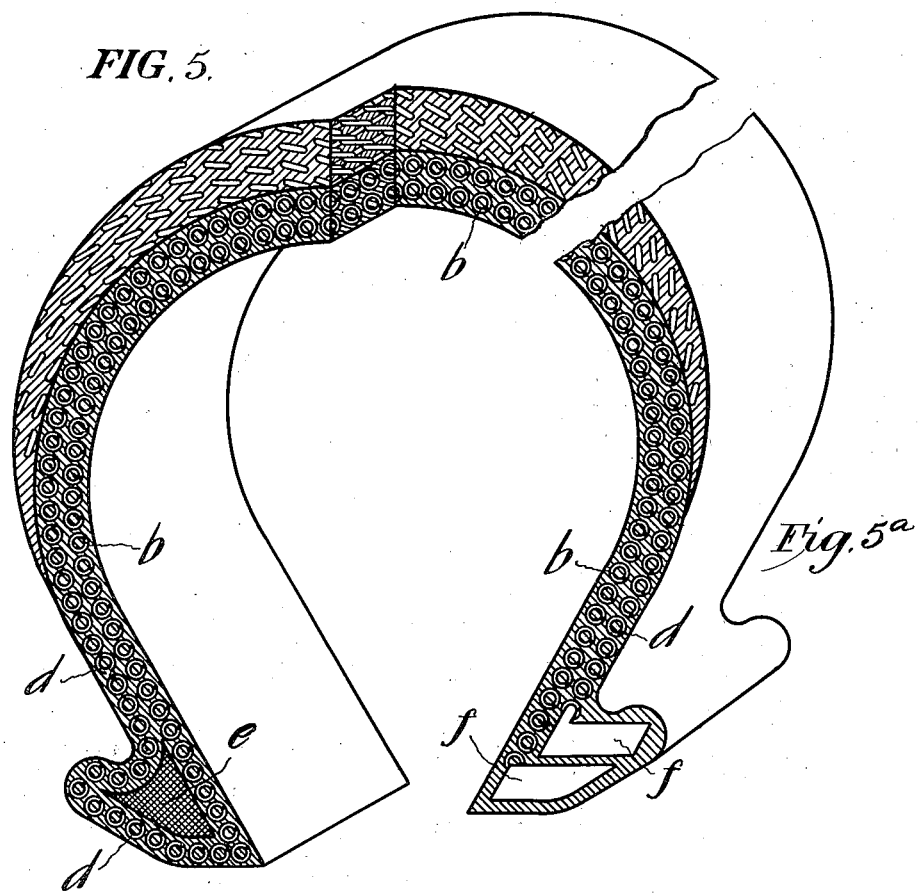
FIG. 5.
Fig. 5a
FIG 6
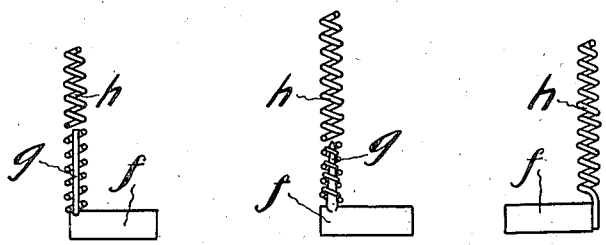

UNITED STATES PATENT OFFICE.

ALFRED EDMUND WALE, OF COLESHILL, ENGLAND, ASSIGNOR TO ALFRED EUGENE HARRIS, OF LEAMINGTON, ENGLAND, AND ERNEST HENRY JONES, OF ISLINGTON, LONDON, ENGLAND.

TIRE COVER AND THE LIKE.

1,415,281.      Specification of Letters Patent.      Patented May 9, 1922.

Application filed June 6, 1913. Serial No. 772,098.

*To all whom it may concern:*

Be it known that I, ALFRED EDMUND WALE, a citizen of Great Britain, and residing at Coleshill, near Birmingham, county of Warwick, England, manufacturer, have invented certain new and useful Tire Covers and the like; and I do hereby declare the following to be a full, clear, and exact description of the same.

This invention comprises improvements in or relating to tires and the manufacture of the same. In tires for motor vehicles it is known to provide a fabric casing, composed of, or containing, two or more layers of threads or cords lying at different angles so that they cross each other, for example at right angles to each other. These threads or cords pass obliquely over the surface of the tire casing for instance at an angle of approximately 30 degrees to the central plane of the circumference of the tire.

To form a puncture proof band around the portion of a tire which is exposed to punctures—the perimeter, mainly a similar arrangement of diagonally crossed cords have been proposed using for each individual cord a wire helix.

A further object of my invention is to obtain flexibility in the sides of the tire, which owing to their inextensibility, are very apt to become frayed and wear out in use owing to the constant changes of tension coming upon them.

In this invention I arrange the diagonally crossed helices so that they not only pass over the perimeter of the tire casing but also extend down each side of the casing to the beads or side edges thereof and are anchored there or assist in forming the beads or side edges.

I prefer to employ tempered steel wire or other suitable spring material for the helices so that the constructed casing will be thoroughly elastic and alive and will not tend to deaden the resiliency of the pneumatic tube which it encloses.

I may if desired cut strips off a sheet of interwoven helices parallel to the axes of the helices to form tapes and use these tapes for the component cords, or I may use two, three or more helices intercoiled. Before or after assembling the helices to form the casing, or during such operation I fill the helices with rubber or other suitable material.

On the drawings;

Figure 1 is a diagrammatic view of the material being assembled on a "former."

Figure 2 is a cross sectional view through the material and former.

Figure 3 is a similar view to Figure 2 but showing a method that may be employed to form a bead.

Figure 4 shows a double or two fold wire helix and a treble or three fold helix such as may be used for the individual helical cords of the casing.

Figure 4ª is a detail view illustrating a strip of three intercoiled helices as cut from a sheet and mentioned above.

Figures 5 and 5ª are cross sectional views of a finished casing provided with a tread and forming a complete outer cover for a tire; in the figures two methods of forming beads are illustrated.

Figure 6 shows details of pins that may be used in forming the beads.

As one method of carrying out my invention I may employ a circular former $a$ of the required shape and size for building up the casing and I carry the wire helices over it from side to side in a diagonal direction. I prefer to employ a number of relatively short helices instead of doubling a long helix backwards and forwards over the former, but the latter method may be employed if desired. I may use a single helix of wire or, and this is preferred, may employ double or treble helices as at Figure 4, or even stronger than the treble helices may be employed if desired.

The helices $b$ are carried diagonally across the former $a$ at a suitable angle, say 30° to the central plane of the circumference and are arranged side by side until a complete layer of them are in position. To prevent the ends of the helices flying off the former I may secure rubber tapes around the former $a$ as at $c$ and press the ends of the helices into the rubber and I may if desired attach rubber varnished tapes over the ends of the helices thus placed on the former or they may be pinned or otherwise temporarily secured. After one layer has thus been placed in position I cover it with rubber or a rubber sheet which may be thoroughly pressed or forced into the layer of helices and I then assemble a second layer $d$, the inclination being in this case opposite in direction to that of the first layer, see Figure 1. This layer may be pressed to some extent into the rubber over the first layer. This second layer is also preferably covered with rubber or a rubber sheet which is pressed or forced into it as before. This forms a satisfactory casing but I may employ further layers preferably in multiples of two with oppositely directed helices as in these first two layers.

Such a casing is shown at Figure 2 and may be provided with a bead or means for securing it in place in a wheel rim in any suitable manner so long as the helices themselves extend down the sides of the casing into the bead or other means. One example of forming a bead is shown at Figure 3 and at the left hand side of Figure 5. In this case to the ends of the first layer of helices, which all finish in a definite edge, or may be cut to do so, I may secure a shaped strip or ring e of rubber or rubber and canvas or fibre or other suitable material and the ends of the second layer may be bent over this strip and secured to it as shown at Figure 3 and the outer rubber sheet is also brought over it and pressed into the helices and if desired the bead thus formed may be covered with rubbered canvas.

The strip e may be secured to the layers of helices by wire pins or may be sewn or bound thereto in any convenient way. As an example cranked or bent pins may be threaded into the ends of the helices so that their ends project out from the helices and the rubber or like of strip e may be pressed onto these.

As a second example headed pins having heads f, Figure 6 may be employed and threaded into or secured to the ends of the helices to project outwardly as shown at Figure 5. The heads f may have plain or screw pin portions g secured in the helices of the layers or such pins may be secured to short lengths h of helices which may be threaded into the helices of the layers of the casing, or as shown at the right of Figure 6 such heads f may be secured direct to the helices of the layers or to short lengths h threaded thereunto.

These heads f when in place form superposed rows attached to the respective layers and may be surrounded with rubber or a suitable compound or material to form a bead as shown at Figure 5.

When the heads f are secured to pins g or lengths of wire, these pins or wires when in place in the casing may project up the sides of the same above the junction of the bead and if their lengths in successive layers are properly arranged they may be graduated off into the material of the casing so that whilst providing additional stiffness or support to the said sides, they do not form a sudden stop or line which might be unsatisfactory as with the less stiff casing above such line all flattening of the tire when under a load might occur where such sudden change from stiffness to flexibility occurred.

It will be understood that I may employ a layer or sheet of rubber first upon the former a and press the first wire layer into this as well as using the rubber layers above each wire layer; this will be the preferred practice unless the helices are filled with rubber before assembling on the former.

The casing may be provided with any suitable tread or covering.

What I claim then is:

1. A pneumatic tire casing comprising layers of wire helices filled with elastic material such as rubber, said wire helices passing diagonally over the tire casing but not being connected into a continuous intercoiled fabric, the helices in one layer crossing those of another layer, beaded edges at the side margins of the tire casing, and said wire helices being arranged so that they pass over not only the perimeter of the tire casing but also down each side of said casing to the beaded edges thereof and are suitably anchored there.

2. A pneumatic tire casing comprising at least two layers of protective members, including double or triple wire helices filled with elastic material such as rubber, said wire helices passing diagonally over the tire casing with all the helices in one layer parallel with each other but at an angle to all the helices in the other layer, said helices in said layers not being connected with one another to form a fabric, and said wire helices being arranged so that they pass over not only the perimeter of the tire casing but also down each side of said casing to the beaded edges thereof and are suitably anchored there.

3. A pneumatic tire casing comprising layers of wire helices filled with elastic material such as rubber, each helix being composed of a plurality of compound helices, said wire helices passing diagonally over the tire casing, the helices in one layer crossing those of another layer, but with all the compound helices in the said layers not connected with one another, beaded edges at the side margins of the tire casing, and said compound wire helices being arranged so that they pass over not only the perimeter of the tire casing but also down each side of said casing and anchoring means including pins having their heads extending outwardly to one side, the ends of said helices being suitably secured to the shanks of said pins, and material, such as rubber, completely surrounding the heads of said pins whereby to form beaded edges for said tire and to firmly retain the ends of the helices in applied position.

4. A pneumatic tire casing comprising a number of wire helices embedded in a rubber layer and directed diagonally in the finished casing, a second layer of helices superposed on said first layer and separated therefrom by a rubber layer, with the direction of the axes of the helices of this second layer opposite to those of the first layer, and a rubber like material covering the said layers of helices.

5. A pneumatic tire casing comprising layers of wire helices filled with elastic material such as rubber, said wire helices passing diagonally over and through the tire casing and being disconnected laterally from one another and out of mutual contact, the helices in one layer crossing those of another layer and said helices being secured at their ends in the edges of the tire casing.

In testimony whereof I affix my signature in presence of two witnesses.

ALFRED EDMUND WALE.

Witnesses:
   KILBERT BRETTELL,
   CHARLES KENILWORTH SHEPHERD.